S. BUEHLER.
HARROW.
APPLICATION FILED OCT. 23, 1914.
1,181,106.
Patented May 2, 1916.
2 SHEETS—SHEET 1.
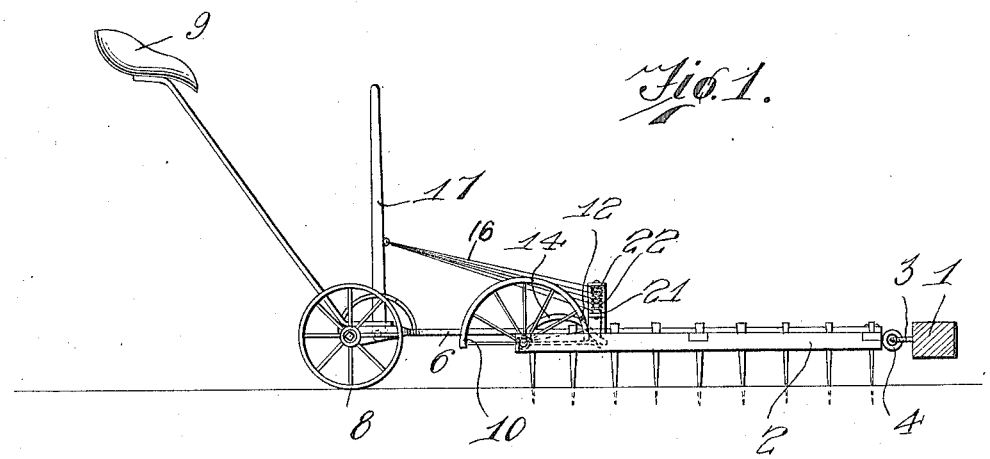
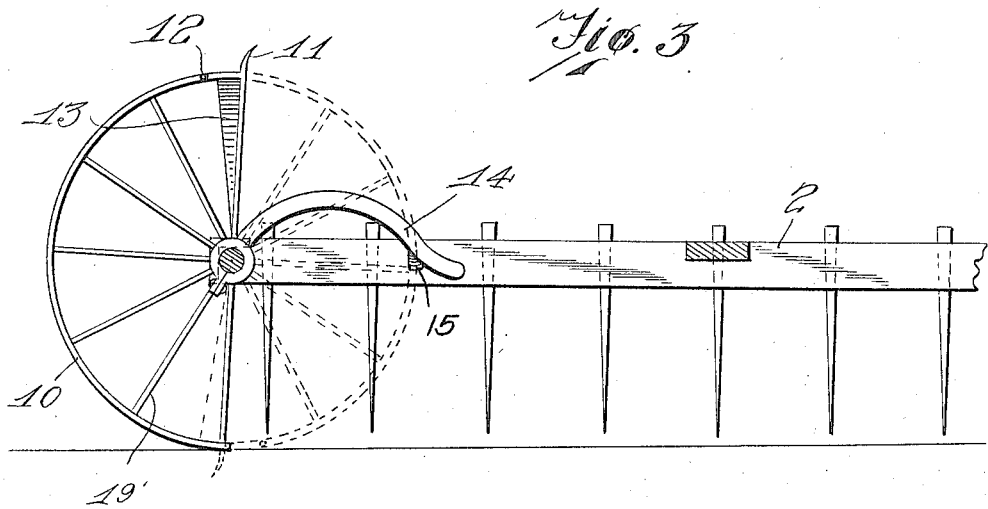
Witnesses
C. R. Hardy
J P Campbell
Inventor
Samuel Buehler
By Richard Owen
Attorney

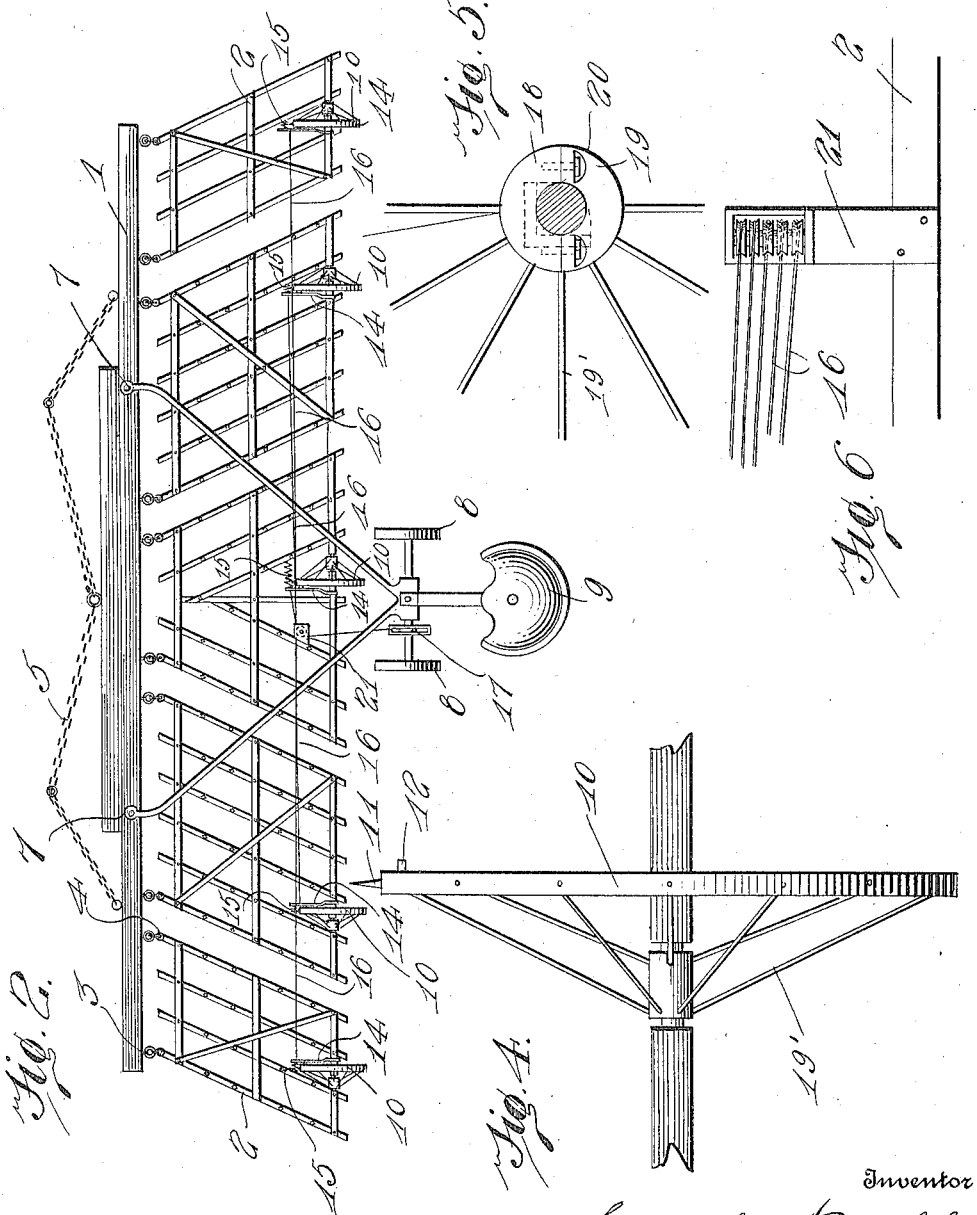

UNITED STATES PATENT OFFICE.

SAMUEL BUEHLER, OF BROOKFIELD, MINNESOTA.

HARROW.

1,181,106.  Specification of Letters Patent.  Patented May 2, 1916.

Application filed October 23, 1914. Serial No. 868,255.

*To all whom it may concern:*

Be it known that I, SAMUEL BUEHLER, a citizen of the United States, residing at Brookfield, in the county of Renville and State of Minnesota, have invented certain new and useful Improvements in Harrows, of which the following is a specification.

My invention relates to new and useful improvements in a harrow and more particularly to a riding harrow.

The primary object of the invention is the provision of a harrow provided with means for automatically raising the harrows from the ground should they engage an obstruction.

A further object is the provision of a harrow in which any number of sections may be used and means for raising all of the sections in unison or raising the individual sections.

With these and other objects in view the invention consists in the novel details of construction and arrangement of parts which will be more clearly understood from the following description and drawings, in which, Figure 1 is a view in side elevation. Fig. 2 is a top plan view. Fig. 3 is a fragmental enlarged side view showing details. Fig. 4 is a detail of the raising wheel construction. Fig. 5 is a fragmental detail of the raising wheel hub construction. Fig. 6 is a detail of the standard for the operating cables.

In the drawings, the numeral 1 indicates a bar to which the various sections 2 of the harrow are connected by means of the eye bolts 3 and 4. A draft bar is secured to the bar 1 by means of the connecting chains 5. A frame 6 is secured to the bar 1, at 7. and is provided on the opposite ends with the supporting wheels 8. A seat 9 is secured on the frame.

To each of the harrow sections 2 a semi-circular wheel 10 is secured, said wheel having a pointed projection 11 extending from the periphery thereof and a pin 12 extending from the side. A weight 13 is secured to the spoke of the wheel at the end having the pointed projection 11. Secured to each of the harrow sections is a spring arm 14 to which is secured a spring 15. the other end of which is secured to one of the harrow bars. The pin 12 on the wheel 10 normally engages one of the spring arms, the weight 13 holding said wheel in position.

Secured to each of the spring arms 14 is a cable 16 and the opposite ends of the cables are connected to a lever 17 pivoted on the frame 6 near the seat 9. The hubs of the semi-circular wheels 10 are formed in two sections 18 and 19, as clearly shown in Fig. 5 of the drawings, and the sections are connected together by means of the bolts 20, as shown. As is clearly shown in Fig. 4 of the drawings, the spokes 19' of the wheel 10 extend at an angle from the rim of the wheel to the hub and the hub is out of alinement with the rim of the wheel. It is necessary to construct the wheels in this manner in order that they may fit between the bars of the harrow sections. As is clearly shown in Fig. 2 of the drawings, the bars of the harrow sections run at an angle and it will be impossible to properly mount the wheels without having the hub set to one side of the rim whereby the wheel may operate between the bars.

Secured upon one of the harrow sections is the standard 21 having a plurality of pulleys therein which receive the various cables 16 directing them to the handle.

As the harrow is being drawn along the ground the semi-circular wheels are in the position shown in Fig. 1 of the drawings, the pins 12 engaging the spring arms 14. Should the harrow engage an obstruction and it is necessary to raise the sections it is only necessary for the operator to pull upon the lever 17 which in turn pulls the cables 16 secured to the catches and this movement releases the catches from the pins 12 of the various semi-circular wheels. The weights 13 on the wheels cause the wheels to drop into the position shown in dotted lines, Fig. 3 of the drawings, so that the pointed projections engage the ground and raise the harrow teeth from the ground. The weights 13 of the wheels will then carry the wheels into their first positions, the pins 12 again engaging the spring arms.

When the lever is operated it will raise all of the sections in unison, but if it is desired to raise only one of the sections the operator may select any one of the cables and release the catch of that section.

In the past considerable difficulty has been found in riding harrows in that the teeth would engage an obstruction and it would be necessary to alight from the harrow to raise the teeth. In my device I have provided a harrow in which the operator may retain his seat and still raise the teeth from the ground.

Having fully described my invention what I claim as new and desire to secure by Letters Patent is:—

1. In a harrow, the combination with a plurality of harrow sections, of a semi-circular wheel secured to each section, catches for holding the wheels in raised position, means for releasing the catches singly, and means for releasing the catches collectively.

2. The combination with a harrow, of a semi-circular wheel, a pin secured to the side of the wheel, a catch adapted to engage the pin for holding the wheel in raised position, and means for releasing the catch.

3. The combination with a harrow, of a semi-circular wheel secured thereto, a pointed projection formed on the wheel, a pin secured to the side of the wheel, a catch adapted to engage the pin on the wheel for holding it in raised position, a weight secured to one end of the wheel, and means for releasing the catch.

4. A harrow comprising a plurality of sections, a semi-circular wheel secured to each of said sections, a projection formed on each of said wheels, a catch secured to each section and adapted to engage the projection for holding the wheel in raised position, cables secured to the catches for releasing the same, and a lever pivoted on the harrow and secured to the cables.

5. A harrow comprising a plurality of sections, a semi-circular wheel secured to each of said sections, a projection formed on each of the wheels, a spring catch carried by each of said sections and adapted to engage the projection on the wheel, a weight secured to one end of each of the wheels, a standard having a plurality of pulleys mounted therein secured to one of the sections, a lever pivotally mounted to the harrow frame, and cables secured to each of the spring catches and extending through the pulleys on the standard and secured to the lever.

6. The combination with a harrow, of a semi-circular wheel secured thereto, said wheel having the hub out of alinement with the rim thereof, a catch for holding the wheel in raised position, and means for releasing the catch.

7. The combination with a harrow, of a semi-circular wheel secured thereto, said wheel comprising a rim, a sectional hub out of alinement with the wheel, and spokes connecting the rim and hub, a catch for holding the wheel in raised position, and means for releasing the catch.

In testimony whereof I affix my signature in presence of two witnesses.

SAMUEL BUEHLER.

Witnesses:
RALPH BRAITHWAIT,
HERMAN LOFFIN.

Copies of this patent may be obtained for five cents each, by addressing the "Commissioner of Patents, Washington, D. C."